United States Patent
Kanamori et al.

(10) Patent No.: US 6,593,003 B2
(45) Date of Patent: Jul. 15, 2003

(54) POLYPROPYLENE RESIN COMPOSITION, T DIE FILM MADE OF THE SAME AND METHOD OF PRODUCING T DIE FILM

(75) Inventors: Kazunori Kanamori, Sodegaura (JP); Shigeki Kishiro, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/282,097

(22) Filed: Oct. 29, 2002

(65) Prior Publication Data

US 2003/0105238 A1 Jun. 5, 2003

Related U.S. Application Data

(62) Division of application No. 09/892,532, filed on Jun. 28, 2001, now Pat. No. 6,512,050.

(30) Foreign Application Priority Data

Jun. 30, 2000 (JP) .......................................... 2000-198909
Jun. 30, 2000 (JP) .......................................... 2000-198911
Mar. 29, 2001 (JP) .......................................... 2001-096100

(51) Int. Cl.$^7$ ......................... B32B 23/08; B32B 27/00; B32B 27/08; B32B 27/10; B32B 27/42
(52) U.S. Cl. ....................... 428/500; 428/507; 428/509; 428/515; 428/516; 428/518; 428/520; 428/521; 428/522; 428/523
(58) Field of Search ................................. 428/500, 507, 428/509, 515, 516, 518, 520, 521, 522, 523

(56) References Cited

U.S. PATENT DOCUMENTS

| | | | |
|---|---|---|---|
| 3,987,122 A | | 10/1976 | Bartz et al. |
| 5,616,627 A | | 4/1997 | Sakurai et al. |
| 5,726,269 A | * | 3/1998 | Ima et al. .................... 526/351 |
| 5,830,402 A | * | 11/1998 | Harada et al. .............. 264/266 |
| 6,110,986 A | | 8/2000 | Nozawa et al. |

FOREIGN PATENT DOCUMENTS

| | | |
|---|---|---|
| JP | 08-176234 A | 7/1996 |
| JP | 10-202720 A | 8/1998 |
| JP | 11-228629 A | 8/1999 |
| JP | 11-255825 A | 9/1999 |

OTHER PUBLICATIONS

Shibata et al., "Development of HMS–PP to polypropylene sheet field", *Montell–JPO* (K.K.), Apr. 1998, pp. 8–11 with complete English translation.

* cited by examiner

*Primary Examiner*—Nathan M. Nutter
(74) *Attorney, Agent, or Firm*—Sughrue Mion, PLLC

(57) ABSTRACT

A polypropylene resin composition comprising 100 parts by weight of a polypropylene resin (A) having a die swell ratio of less than about 1.70 and about 0.01 to about 45 parts by weight of a polypropylene resin (B) having a die swell ratio of about 1.80 or more. A T die film is also provided, composing polypropylene wherein the film has a molecular weight distribution of about 4.2 or less and a die swell ratio of 1.28 or more. A method of producing a T die film is also provided, comprising the steps of melt-kneading polypropylene by an extruder, extruding the melted product through a die lip, and cool-solidifying the extruded material by a cooling roll to form a film. The film resulting by this method has a molecular weight distribution about of 4.2 or less and a die swell ratio of about 1.28 or more. Further, the present invention provides a laminated molded body comprising a heat molded body composed of a polypropylene resin composition containing 100 parts by weight of polypropylene resin (A), about 0.01 to about 45 parts by weight of a polypropylene resin (B) and a substrate comprising a thermoplastic resin.

1 Claim, 1 Drawing Sheet

POLYPROPYLENE RESIN COMPOSITION, T DIE FILM MADE OF THE SAME AND METHOD OF PRODUCING T DIE FILM

This is a divisional of application Ser. No. 09/892,532 filed Jun. 28, 2001 and now U.S. Pat. No. 6,512,050 the disclosure of which is incorporated herein by reference.

FIELD OF THE INVENTION

The present invention relates to a polypropylene resin composition, a T die film made of the same, and a method of producing a T die film, and, more specifically, a thermal molded body made of a polypropylene resin composition and a substrate made of a thermoplastic resin.

BACKGROUND OF THE INVENTION

Films made of a polypropylene resin containing structural units derived from propylene as the main structural unit are excellent in optical properties, mechanical properties and wrapping suitability. Therefore, they are widely used in the wrapping fields such as for food wrapping, fiber wrapping and the like. However, when a T die film used in the fields such as a retort pouch and the like, is produced using a polypropylene-based resin having a narrow molecular weight distribution, there sometimes occurs a problem that the surface of the film is roughened and transparency may be lost.

Further, recently, T die film produced at high speed by a large scale film forming machine is sometimes not satisfactory in transparency, appearance and tearing strength along the MD (machine direction), since film cooling efficiency of the machine is deteriorated and orientation along the MD (longitudinal direction in film formation) increases.

For example, a film obtained by processing at high speed a polypropylene-based resin having a relatively wide molecular weight distribution and having a larger die swell ratio may exhibit unsatisfactory tearing strength along the MD direction, though the extent of insufficiency in transparency and appearance is small.

On the other hand, a film obtained by processing at high speed a polypropylene-based resin having a relatively narrower molecular weight distribution and having a smaller die swell ratio may experience deterioration in transparency, or touch roll marks on the surface of the film which occur when the film is not sufficiently cooled and crystal solidification is insufficient, and the like.

Furthermore, when the resulting film, sheet and the like are going to be subjected to secondary molding process such as thermoformed article and the like, the temperature range in which such sheet is thermoformed is narrow and the processability of thermoforming is poor. Therefore, it is difficult to obtain a laminated molding article which has a body obtained by thermally molding, has excellent production suitability and high scratch resistance.

SUMMARY OF THE INVENTION

An object of the present invention is to provide a polypropylene resin composition which avoids the above-mentioned failure in appearance caused by roughening the surface of a film even if a polypropylene-based resin having narrow molecular weight distribution, for example, is used. A T die film obtained by the polypropylene resin composition, and a method of producing the T die film are also provided. Another object of the present invention is to provide a polypropylene resin composition which can provide a film excellent in balance between transparency, appearance and tearing strength along the MD direction even when a T die film is, particularly, produced at high speed, a T die film obtained by the polypropylene resin composition, and a method of producing the T die film.

A further object of the present invention is to provide a laminated molding article which is a thermoformed molding article having a wide temperature range of thermoforming and excellent molding property, and which is excellent in production suitability and has high scratch resistance.

The foregoing objects and other objectives are achieved by the present invention which provides a polypropylene resin composition comprising 100 parts by weight of a polypropylene resin (A) having a die swell ratio of less than about 1.70 and about 0.01 to about 45 parts by weight of a polypropylene resin (B) having a die swell ratio of about 1.80 or more, a T die film comprising polypropylene wherein the film has a molecular weight distribution of about 4.2 or less and a die swell ratio of about 1.28 or more, and a method of producing a T die film comprising the steps of melt-kneading polypropylene by an extruder, extruding the melt-kneaded product through a die lip, and cooling and solidifying the extruded material by a cooling roll to form a film, wherein the film resulting by this method has a molecular weight distribution of about 4.2 or less and a die swell ratio of about 1.28 or more.

Further, the present invention provides a laminated molded body comprising a heat molded body which comprises a polypropylene resin composition containing 100 parts by weight of a polypropylene resin (A) having a die swell ratio of less than about 1.70 and about 0.01 to about 45 parts by weight of a polypropylene resin (B) having a die swell ratio of about 1.80 or more, and a substrate comprising a thermoplastic resin.

DETAILED DESCRIPTION OF THE INVENTION

Figure 1:
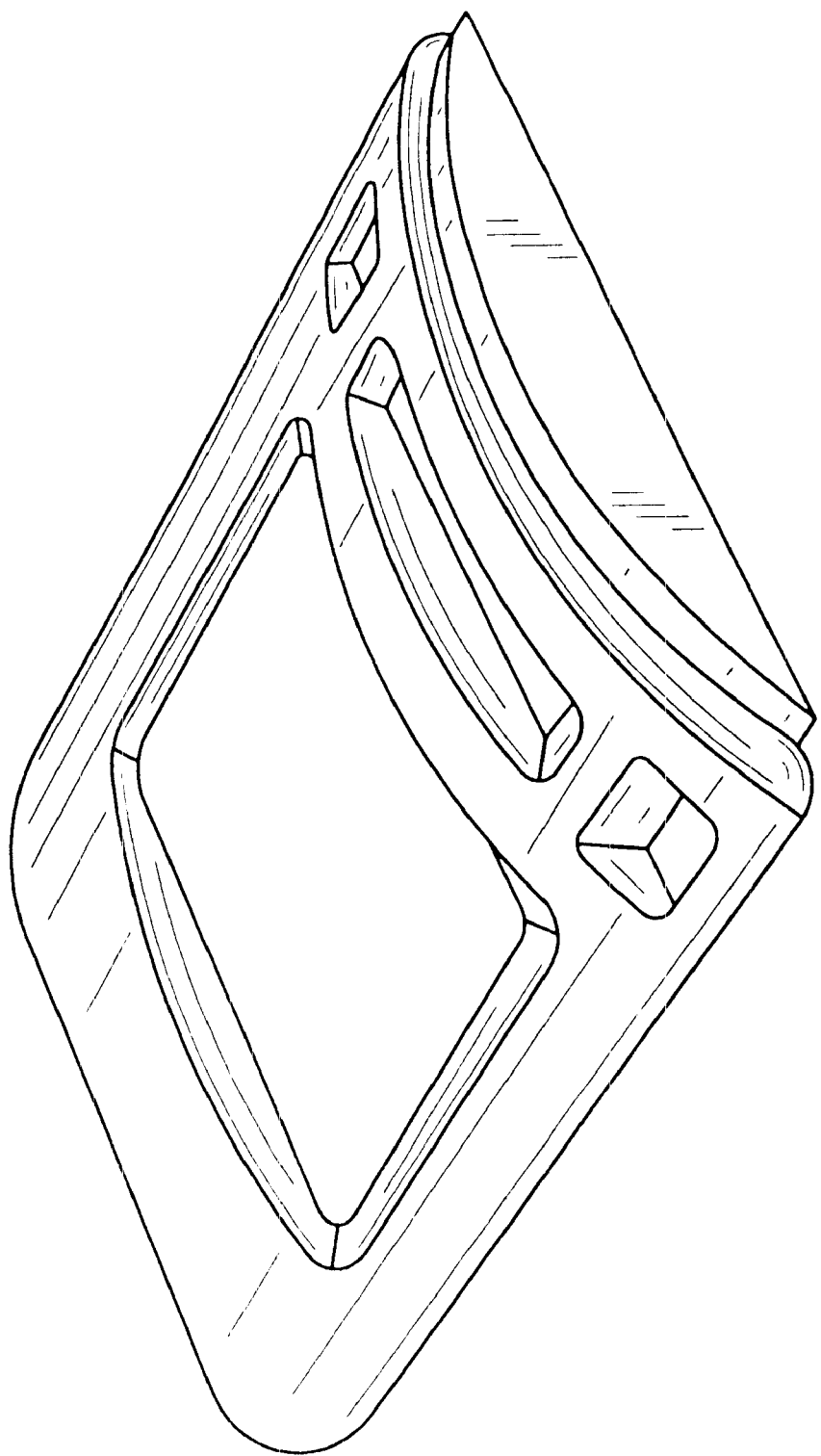
FIG. 1 is a perspective view of a heat molding die used in the example.

The present invention will be illustrated in detail below.

"Die swell ratio" as used in the present invention, is calculated according to the following formula (1):

$$\text{Die swell ratio} = \text{diameter of cross section of extruded material} / \text{diameter of orifice} \quad (1)$$

In the formula, "diameter of cross section of extruded material" can be obtained by measuring the diameter of the cross section of an extruded material during the course of measuring melt flow rate (MFR) according to JIS K7210, Condition Number 14. Here, "cross section of an extruded material" means the cross section of an extruded material vertical to the extrusion direction. When the cross section of an extrude article is not in the form of completely round shape, the diameter of the cross section is the average value of the maximum diameter and the minimum diameter of the cross section.

The die swell ratio of the polypropylene resin (A) used in the present invention is less than about 1.70, preferably less than 1.70, more preferably about 1.60 or less, further preferably about 1.50 or less, particularly preferably about 1.35 or less. The lower limit of the die swell ratio is usually over 1.

"Polypropylene resin (A)" of the present invention is preferably (1) a homopolymer of propylene, or (2) a copolymer of propylene with at least one of ethylene and an α-olefin having 4 to 12 carbon atoms in which repeating units of propylene (hereinafter, sometimes referred to as "propylene unit") are present in a proportion of at least 50% by weight based on 100% by weight of the copolymer. This homopolymer or copolymer may be used alone or in combinations of two or more.

The above-mentioned ethylene and α-olefins having 4 to 12 carbon atoms may be used for controlling the flexibility and impact-resistance of the resulting copolymer. Examples of α-olefins suitable for use in the present invention include 1-butene, 4-methyl-1-pentene, 1-hexene and 1-octene. Among them, 1-butene is preferable from the standpoints of flexibility and impact-resistance.

When the copolymer is an ethylene-propylene-α-olefin copolymer, the content of ethylene units is preferably about 10% by weight or less, and the content of α-olefin is preferably about 30% by weight or less, based on 100% by weight of the copolymer. When two or more α-olefins are used, it is preferable that the total amount thereof is about 30% by weight or less.

Examples of polypropylene resin (A) suitable for use in the present invention include (i) a homopolymer of propylene, (ii) a random copolymer of propylene with ethylene, (iii) a random copolymer of propylene with α-olefin having 4 to 12 carbon atoms, (iv) a ternary random copolymer of propylene, ethylene and an α-olefin having 4 to 12 carbon atoms in which the content of ethylene units is about 10% by weight or less and the content of α-olefin units having 4 to 12 carbon atoms is about 30% by weight or less based on 100% by weight of the copolymer and (v) a block copolymer of propylene with ethylene.

In the present invention, the molecular weight distribution of the polypropylene resin (A) is usually from about 1.5 to about 5.0, and from the standpoint of the tearing strength along the MD direction of a T die film described later, it is preferably from about 1.8 to about 4.0. In the present invention, "molecular weight distribution" means the ratio (Mw/Mn) of the weight-average molecular weight (Mw) to the number-average molecular weight (Mn).

Any suitable method may be used for producing the polypropylene resin (A) including, for example, a gas phase polymerization method or a solvent polymerization method. Preferably, polypropylene resin (A) is produced by gas phase polymerization. Any suitable catalyst may be used in the polymerization including, for example, multi-site catalysts obtained by using a solid catalyst component containing a titanium atom, magnesium atom and halogen atom, single-site catalysts obtained by using a metallocene complex, and the like.

The die swell ratio of the polypropylene resin (B) used in the present invention is about 1.80 or more, preferably 1.80 or more, more preferably about 2.00 or more, for obtaining a film excellent in transparency and appearance. The upper limit of the die swell ratio is not particularly restricted, and higher is more preferable, and the upper limit may be around 3, but values higher than 3 are within the scope of the invention.

The amount of the polypropylene resin (B) used is from about 0.01 to about 45 parts by weight, preferably from about 0.01 to about 30 parts by weight, more preferably from about 0.1 to about 20 parts by weight, further preferably from about 0.2 to about 15 parts by weight, based on 100 parts by weight of the polypropylene resin (A), from the standpoint of obtaining a film excellent in balance between transparency, appearance and tearing strength along the MD direction.

"Polypropylene resin (B)" used in the present invention is preferably (1) a homopolymer of propylene, or (2) a copolymer of propylene with at least one of ethylene and an α-olefin having 4 to 12 carbon atoms in which propylene units are present in a proportion of at least 50% by weight based on 100% by weight of the copolymer, like in the case of the above-mentioned "polypropylene resin (A)".

Examples of the polypropylene resin (B) suitable for use in the present invention include (i) non-linear polypropylene resins having strain-hardening elongation viscosity, and (ii) polypropylene resins having a wide molecular weight distribution produced by a multi-stage polymerization method.

Preferably, the polypropylene resin (B) is a polypropylene resin (B-1) having a limiting viscosity of less than about 3 dl/g and a molecular weight distribution of less than about 10, obtained by a production method comprising the following steps 1 and 2.

Step 1: A process for producing a polypropylene polymer (a) having a limiting viscosity of about 5 dl/g or more, by homo-polymerizing propylene, or copolymerizing propylene with at least one of ethylene and an α-olefin having 4 to 12 carbon atoms.

Step 2: A process for producing a polypropylene polymer (b), in the presence of the above-mentioned propylene polymer (a), by homo-polymerizing propylene, or copolymerizing propylene with at least one of ethylene and an α-olefin having 4 to 12 carbon atoms, wherein the polymer (b) has a limiting viscosity of less than about 3 dl/g and the proportion of the above-mentioned propylene polymer (a) is from about 0.05 to about 35% by weight based on 100% by weight of the polypropylene resin (B-1).

The production method may be, for example, (1) a batch-wise polymerization method in which the step 1 and the step 2 are conducted in the same polymerization tank, or (2) a continuous polymerization method in which the step 1 and the step 2 are conducted continuously in two or more polymerization tanks connected in series, and the like.

The limiting viscosity of the above-mentioned polypropylene polymer (a) is, for obtaining a T die film having excellent appearance as described later, preferably about 6.0 dl/g or more, more preferably 6.0 dl/g or more, further preferably about 7.0 dl/g or more. Though a higher limiting viscosity is more preferable, the upper limit of the limiting viscosity is usually less than about 15.0 dl/g, and. from the standpoint of compatibility with the polypropylene polymer (b), it is preferably less than 15.0 dl/g, more preferably less than about 13.0 dl/g, further preferably less than about 11.0 dl/g, with values higher than 15 dl/g being within the scope of the invention.

The proportion of the polypropylene polymer (a) in the polypropylene resin (B-1) is from about 0.05 to about 35% by weight, preferably from about 0.1 to about 25% by weight, more preferably from about 0.3 to about 18% by weight, based on 100% by weight of B-1.

The limiting viscosity of the polypropylene polymer (b) is, for obtaining a resin composition having excellent flowability and processability, less than about 3.0 dl/g, preferably less than 3.0 dl/g, more preferably about 2.0 dl/g or less. Though the lower limit of the limiting viscosity is not particularly restricted, it is usually about 0.5 dl/g or more with lower values being within the scope of the invention. From the standpoint of processability, it is more preferably about 0.8 dl/g or more, further preferably about 1.0 dl/g or more. A polypropylene polymer (b) having the above-mentioned limiting viscosity can be produced by appropriately setting the production conditions of the step 2.

The limiting viscosity $[\eta]b$ of the polypropylene polymer (b) can be calculated according to the following formula (2). Here, $[\eta]B\text{-}1$ represents the limiting viscosity of the polypropylene resin (B-1), $[\eta]a$ and $W_a$ represent the limiting viscosity and the content (wt %) of the polypropylene polymer (a), respectively, and $W_b$ represents the content (wt %) of the polypropylene polymer (b).

$$[\eta]_b ([\eta]_{B\text{-}1} \times 100 - [\eta]_a \times W_a)/W_b \qquad (2)$$

The limiting viscosity of the above-mentioned polypropylene polymer (B-1) is, from the standpoint of obtaining a resin composition excellent in flowability and processability, less than about 3.0 dl/g, preferably less than 3.0 dl/g, more preferably less than about 2.8 dl/g. The lower limit of the limiting viscosity is not particularly restricted, and usually is about 1.0 dl/g or more, and from the standpoint of processability, it is more preferably 1.0 dl/g or more, further preferably about 1.2 dl/g or more with values less than 1.0 dl/g being within the scope of the invention.

The molecular weight distribution of the polypropylene polymer (B-1) is less than about 10, preferably from about 4 to about 8.

For obtaining the polypropylene polymer (B-1) having the above-mentioned suitable die swell ratio, it is preferable that the limiting viscosity [η]a(dl/g) and the content (wt %) of the polypropylene polymer (a) satisfy the following formula (3).

$$W_a \geq 400 \times \mathrm{EXP}(-0.6 \times [\eta]_a) \qquad (3)$$

The polypropylene polymers (a) and (b) are usually polypropylene polymers having an isotactic polypropylene crystal structure. The polypropylene polymers (a) and (b) are preferably a polymer obtained by homopolymerization of propylene, or a copolymer obtained by copolymerization of propylene with at least one of ethylene and an α-olefin having 4 to 12 carbon atoms, in such amount that the polymers (a) or (b) do not lose crystallinity. The α-olefin may be, for example, 1-butene, 4-methyl-1-pentene, 1-hexene and 1-octene, and the like.

The above-mentioned "such amount that the polymers (a) or (b) do not lose crystallinity" is usually dependent on the kinds of comonomers copolymerized with propylene. When the comonomer is ethylene, the content of ethylene units in the copolymer is usually about 10% by weight or less, and when the comonomer is an α-olefin such as 1-butene. the content of an α-olefin in the copolymer is usually about 30% by weight or less.

Preferably, the polypropylene polymers (a) and (b) are any of the following (1) to (4).

The copolymer (2) is, from the standpoint of obtaining a resin composition excellent in flexibility and impact resistance, particularly preferably a random copolymer of propylene with ethylene having an ethylene unit content of about 1 to about 10% by weight. In the copolymers (3) and (4), 1-butene is a preferable α-olefin.

(1) A homopolymer of propylene.
(2) A random copolymer of propylene with ethylene in which the content of ethylene units is about 10% by weight or less based on 100% by weight of the weight of the copolymer.
(3) A random copolymer of propylene with an α-olefin having 4 to 12 carbon atoms in which the content of α-olefin units having 4 to 12 carbon atoms is about 30% by weight or less based on 100% by weight of the weight of the copolymer.
(4) A ternary random copolymer of propylene, ethylene and an α-olefin having 4 to 12 carbon atoms in which the content of ethylene units is about 10% by weight or less and the content of α-olefin units having 4 to 12 carbon atoms is about 30% by weight or less based on 100% by weight of the weight of the copolymer.

The monomer units and amounts thereof present in the polypropylene polymer (a) may be the same as or different from those of the polypropylene polymer (b).

The catalyst used for producing the above-mentioned polypropylene resin (B-1) can be, for example, multi-site catalysts obtained by using a solid catalyst component containing a titanium atom, magnesium atom and halogen atom, single-site catalysts obtained by using a metallocene complex, and the like. The former multi-site catalyst is preferable. A preferable method of producing the polypropylene resin (B-1), methods is exemplified in JP-A No. 11-228629.

The polypropylene resin composition of the present invention may be used in combination with, for example, phenol-based stabilizers such as 2,6-di-t-butyl-p-cresol (BHT), tetrakis[methylene-3-(3,5-di-t-butyl-4-hydroxyphenyl)propionate]methane (IRGANOX 1010) and n-octadecyl-3-(4'-hydroxy-3,5'-di-t-butylphenyl)propionate (IRGANOX 1076); phosphite-based stabilizers such as bis (2,4-di-t-butylphenyl)pentaerythritol diphosphite and tris(2, 4-di-t-butylphenyl) phosphite; lubricants such as higher fatty amides and higher fatty esters; antistatic agents such as glycerin esters of fatty acids having 8 to 22 carbon atoms, sorbitan esters of the same fatty acids, and polyethylene glycol esters; blocking inhibitors such as calcium carbonate and talc; and polyethylene resins such as ethylene-α-olefin copolymers, low density polyethylenes and high density polyethylenes, for further improving the physical properties of the resin composition.

Additives such as the above-mentioned processing improving agents, stabilizers, lubricants and blocking inhibitors, may be previously melt-kneaded with a polypropylene resin, or a dry blend method may be used in which each additive and polypropylene resin are directly blended in use. Further, one or more additive master batches may be produced before being blended with a polypropylene resin.

Next, the T die film of the present invention will be described.

T die film of the present invention is a film of polypropylene. From the standpoint of excellent tearing strength along the MD direction of a film obtained by high speed film formation, the molecular weight distribution of the resulting T die film is preferably about 4.2 or less, more preferably about 4.0 or less. The lower limit of the molecular weight distribution is not particularly restricted, and usually is 1 or more. The die swell ratio of the resulting film is, from the standpoint of excellent transparency and appearance of a film obtained by high speed film formation, preferably about 1.28 or more, more preferably about 1.30 or more. When the die swell ratio of the resulting film is too large, molecule orientation may increase excessively in forming a film and the tearing strength along the MD may decrease, therefore, it is usually 2 or less, with value about 2 being within the scope of the present invention.

As used herein, the term "high speed film formation" means that the film formation speed is about 130 m/min or more as described later.

Further, as used herein, the term "polypropylene" used for producing above T die film means a propylene homopolymer, copolymer of ethylene with propylene, a copolymer of an α-olefin having 4 to 12 carbon atoms with propylene, a copolymer of ethylene, an α-olefin having 4 to 12 carbon atoms and propylene, or the like, and a composition thereof. The molecular weight distribution and the die swell ratio of the resulting film are not particularly restricted providing they are within the above-mentioned ranges.

A T die film of the present invention can be obtained by using the above-mentioned polypropylene resin composition comprising 100 parts by weight of a polypropylene resin (A) having a die swell ratio of less than about 1.70 and about 0.01 to about 45 parts by weight of a polypropylene resin (B) having a die swell ratio of about 1.80 or more. Such a T die film is a film excellent in appearances such as transparency and the like in which the surface is scarecely roughened as described above.

Preferably, the polypropylene resin (A) can be (i) a homopolymer of propylene, (ii) a random copolymer of propylene With ethylene, (iii) a random copolymer of propylene with α-olefin, (iv) a ternary random copolymer of propylene ethylene and an α-olefin having 4 to 12 carbon atoms in which the content of ethylene units is about 10% by weight or less and the content of α-olefin units having 4 to 12 carbon atoms is about 30% by weight or less based on 100% by weight of the copolymer and (v) a block copolymer of propylene with ethylene, as described above.

The molecular weight distribution of the polypropylene resin (A) is preferably about 4.0 or less, more preferably 4.0 or less, from the standpoint of obtaining a T die film excellent in the tearing strength along MD in high speed film formation. The lower limit of the molecular weight distribution is usually 1.

The method of producing the polypropylene resin (A) is also as described above.

The die swell ratio of the polypropylene resin (B) is, from the standpoint of obtaining a film excellent in transparency and appearance in high speed film formation, about 1.80 or more, preferably 1.80 or more, more preferably about 2.00 or more. The upper limit of the die swell ratio is not particularly restricted, and a higher is more preferable. The upper limit of the die swell ratio of the polypropylene resin (B) is usually around 3, with higher values being within the scope of the present invention.

The amount of the polypropylene resin (B) used is, from the standpoint of obtaining a film excellent in balance between transparency, appearance and tearing strength along the MD direction of the resulting film, from about 0.01 to about 45 parts by weight, preferably from about 0.01 to about 30 parts by weight, more preferably from about 0.10 to about 20 parts by weight, further preferably from about 0.20 to about 15 parts by weight, based on 100 parts by weight of the polypropylene resin (A).

The polypropylene resin is preferably (1) a homopolymer of propylene, or (2) a copolymer of propylene with at least one of ethylene and an α-olefin having 4 to 12 carbon atoms in which propylene units are present in a proportion of at least about 50% by weight based on 100% by weight of the copolymer.

The polypropylene resin (B) used in the T die film of the present invention may, for example, be (i) non-linear polypropylene resins having strain-hardening elongation viscosity, and (ii) polypropylene resins having wide molecular weight distribution produced by a multi-stage polymerization method.

The more preferable polypropylene resin (B) may be a polypropylene resin (B-1) having a limiting viscosity of less than about 3 dl/g and a molecular weight distribution of less than about 10, obtained by a production method comprising the following steps 1 and 2.

Step 1: A process for producing a polypropylene polymer (a) having a limiting viscosity of 5 about dl/g or more, by homo-polymerizing propylene, or copolymerizing propylene with at least one of ethylene and an α-olefins having 4 to 12 carbon atoms.

Step 2: A process for producing a polypropylene polymer (b), in the presence of the above-mentioned propylene polymer (a), by homo-polymerizing propylene, or copolymerizing propylene with at least one of ethylene and α-olefins having 4 to 12 carbon atoms, wherein the polymer (b) has a limiting viscosity of less than about 3 dl/g and the proportion of the above-mentioned propylene polymer (a) is from about 0.05 to about 35% by weight based on 100% by weight of the polypropylene resin (B-1).

Specific embodiments of the above-mentioned production method are as described above.

The preferable limiting viscosities and compounding amounts of the above-mentioned polypropylene polymers (a) and (b) are also as described above.

The limiting viscosity of the above-mentioned polypropylene polymer (B-1) is, from the standpoint of flowability and processability in forming a T die film, less than about 3.0 dl/g, preferably less than 3.0 dl/g, more preferably less than about 2.0 dl/g. The lower limit of the limiting viscosity is not particularly restricted, and usually is about 0.5 dl/g or more, with lower limiting viscosities being within the scope of the invention. From the standpoint of processability, it is more preferably about 0.8 dl/g or more, further preferably about 1.0 dl/g or more. A polypropylene polymer (b) having the above-mentioned limiting viscosity can be produced by appropriately setting the production conditions of the step 2.

The T die film of the present invention can be produced by a production method comprising the steps of melt-kneading polypropylene by an extruder, extruding the melted product through a die lip, and cooling the extruded material to solidify it by a cooling roll.

Any suitable processing conditions can be utilized including, for example, conditions in which a resin is extruded through a die lip at a temperature of a resin at the tip of an extruder of from about 190 to about 300° C. and a shearing speed of from about 50 to about 100000 sec−1, and the resin is cooled and solidified by a cooling roll having a surface temperature of about 20 to about 60° C. to form a film. Regarding the film forming speed of the T die film, higher speed are more preferable from the standpoint of productivity, and it is usually about 50 m/min or more, preferably about 130 m/min or more, more preferably about 170 ml/min or more, particularly preferably about 220 m/min or more, and the above-mentioned high speed film formation condition means usually a speed of about 130 m/min or more.

In the present invention, when a polypropylene resin composition comprising the above-mentioned polypropylene resin (A) and polypropylene resin (B) is used, excellent appearance of a film is obtained. Further, the above-mentioned polypropylene resin composition may also be processed into a film at a film formation speed of about 130 m/min or more. The upper limit of the film formation speed differs depending on the ability of a processor used, and the like, and the upper limit thereof may, for Example, be about 1000 m/min, about 700 m/min, about 500 m/min and about 400 m/min and the like, with speeds higher than about 1000 m/min being within the scope of the invention. The film formation speed herein referred to is the surface transferring speed (linear speed) of a cooling roll, and usually a set value of the processor.

Any suitable film processor may be used in the method of producing a T die film of the present invention. As this apparatus, known T die film processors, known extrusion lamination processors and known T die sheet molding machines are exemplified. Among them, T die film processors are preferable.

The thickness of the T die film of the present invention is preferably from about 5 μm to about 5 mm, and a more preferable range is from about 10 μm to about 250 μm. In the case of use in heat molding described later, the thickness is from about 5 to about 800 μm, preferably from about 50 to about 500 μm.

The T die film of the present invention may be single-layer film, or a multi-layer film containing one or more layers comprising the polypropylene resin composition of the present invention.

The T die film of the present invention may be used for any suitable purpose. For example, the T die film may be used for wrapping foods such as bread and vegetable, wrapping clothes such as a shirt, wrapping industrial parts.

The T die film of the present invention can be laminated on a substrate by known lamination methods such as a dry lamination method and sandwich lamination method to obtain a laminated film. The substrate may, for example, be cellophane, paper, card board, aluminum foil, polyamide resins such as nylon 6 and nylon 66 and the like, polyester resins such as polyethylene terephthalate and polybutylene terephthalate, drawn polypropylene, and the like.

Further, the T die film of the present invention obtained from a polypropylene resin composition (hereinafter, sometimes abbreviated as polypropylene resin composition (C))

comprising about 100 parts by weight of a polypropylene resin (A) having a die swell ratio of less than about 1.70 and about 0.01 to about 45 parts by weight of a polypropylene resin (B) having a die swell ratio of about 1.80 or more has excellent thermoforming properties of vacuum molding and the like. Therefore, this T die film can be a thermoformed article containing one or more layers of the polypropylene resin composition (C). This thermoformed article is obtained by thermoforming a T die film or laminated film obtained by the above-mentioned method from the polypropylene resin composition (C). The thermoforming method may, for example, be vacuum molding, air compression molding, vacuum air compression molding and the like.

The above-mentioned thermoformed article preferably has a layer comprising the polypropylene resin composition (C) and a design layer, for efficient decoration of a substrate described below. For example, the molded body may be laminated sheets comprising two layers of a transparent layer and a printing layer or coloring layer, laminated sheets comprising a transparent layer and a printing layer and coloring layer, and the like.

A laminated molding article can be obtained by pasting the above-mentioned thermoformed article with a substrate comprising the thermoplastic resin. The thermoplastic resin substrate may be any known thermoplastic resins including, for example, thermoplastic resin used in the automobile field and electric appliances field such as crystalline olefin polymer resins.

The crystalline olefin polymer resin comprises an olefin polymer having a crystalline property including, for example, a propylene polymer, an ethylene polymer, a 1-butene polymer and the like. Preferably, the crystalline olefin polymer resin is a propylene polymer (hereinafter, referred to as propylene polymer (D)). The propylene polymer (D) is a polymer obtained by polymerizing propylene including, for example, a homopolymer of propylene and copolymers obtained by copolymerizing propylene with another comonomer (for example, ethylene, 1-butene and the like). The copolymer may be a random copolymer, block copolymer or the like. The crystalline olefin polymer resin used in the present invention is preferably a propylene homopolymer, and more preferably a propylene homopolymer having an isotactic pentad ratio of about 0.95 or more, most preferably a propylene homopolymer having an isotactic pentad ratio of about 0.97 or more. Further, coplymers obtained by adding talc and/or rubber to such propylene polymers can be suitably used.

The resin of the substrate is preferably easily adhered to the above-mentioned thermoformed article, and are preferably resins which can be melt-adhered to the heat molded body. From the standpoint of adhesion of a thermoformed article to a substrate, it is particularly preferable that the resin of the surface adhered to the substrate of the thermoformed article and the resin substrate are made of the same resin or an analogous resins.

The laminated molded body mentioned above may be produced by known method including, for example, a method comprising the following steps (I) to (IV) is exemplified.

(I) A step of heat-softening the above-mentioned thermoforming sheets.

(II) A process of thermoforming the softened sheets in a heat molding die to obtain a thermoformed article.

(III) A process of setting the above-mentioned thermoformed article on the cavity side of the molding die.

(IV) A process of providing a molten thermoplastic resin for a substrate into the above-mentioned die on which the thermoformed article has been set, to obtain a laminated molding article comprising the injected resin (substrate) and the thermoformed article laminated to each other.

The thermoforming methods used in step (I) and (II) may, for example, be the above-mentioned vacuum molding, air compression molding, vacuum air compression molding and the like.

The thermoforming methods used in step (IV) may, for example, be an injection molding method, injection compression molding method and injection press molding method. The temperature of the resin injected in this process is usually the melting point of the resin or higher, preferably about 200° C. or more. The temperature of the die in this process is usually from about 20 to about 60° C., preferably from about 30 to about 40° C. The surface of the die is preferably smooth, and the surface roughness (Ra) is preferably about 0.1 $\mu$m or less, more preferably about 0.08 $\mu$m or less, further preferably about 0.06 $\mu$m or less.

Further, a thermo-injection method which can carry out the processes (I) to (IV) in one step, for example, may also be used.

The laminated molding article of the present invention is suitably used as, for example, an automobile part such as a center cluster, by laminating a substrate and a multi-layer heat molded body comprising decorated sheets such as colored sheets, grained sheets, sheets having a metallic feeling and sheets having a carbon feeling.

EXAMPLES

The following examples illustrate the present invention, but are not intended to limit the scope of the invention.

Polymers used in the examples and comparative examples are as follows.

PP-1: A random copolymer of propylene and ethylene manufactured by Sumitomo Chemical Co., Ltd. Trade name: Norbrene WF577PG2, lot number: PIF129, melt flow rate (MFR): 3 g/10 min, die swell ratio: 1.16, ethylene content: 4 wt %.

PP-2: A homopolymer of propylene manufactured by Sumitomo Chemical Co., Ltd. Trade name: Norbrene Y101, lot number: FAZ356, MFR: 10 g/10 min, die swell ratio: 1.69.

PP-3: A homopolymer of propylene manufactured by Sumitomo Chemical Co., Ltd. Trade name: Norbrene Y101, lot number: FAH468, MFR: 13 g/10 min, die swell ratio: 1.25.

PP-4: A homopolymer of propylene obtained in the following Reference Example 1. The polymer was in pellet form and had a weight-average molecular weight (Mw) of $3.4 \times 10^5$, a molecular weight distribution (Mw/Mn) of 8.0, a MFR of 12 g/10 min, and a die swell ratio (SR) of 2.35.

Evaluation Methods are as Follows.

1. Limiting Viscosity (dl/g) of Polymer

It was measured in 135° C. tetralin using a Ubbellohde viscometer.

2. Melt Flow Rate (MFR: g/10 min)

It was measured at 230° C. according to the method of JIS K7210, Condition Number 14.

3. Die Swell Ratio (SR)

It was calculated by the formula (1) according to the above-mentioned method.

4. Molecular Weight Distribution

The weight-average molecular weight (Mw) and number-average molecular weight (Mn) for obtaining the molecular weight distribution were measured by a gel permeation chromatography method (GPC) composed of the following procedure.

Step 1: A mixture of 5 mg of a sample and 8 ml of ortho dichlorobenzene is heated at 140° C. for 2 hours to obtain a solution.

Step 2: The solution obtained in step 1 is filtered through a 0.5 $\mu$m filter to obtain a filtrate.

Step 3: The filtrate obtained in step 2 is analyzed by a gel permeation chromatography method (GPC) under the following conditions, and the weight-average molecular weight (Mw) and the number-average molecular weight (Mn) are obtained using calibration curves made by using standard polystyrene.

Apparatus: 150CV type manufactured by Millipore Waters
Column: Shodex M/S 80
Temperature: 145° C.
Mobile phase: Ortho dichlorobenzene 5. Haze Haze was measured according to JIS K7105.

6. Pencil Hardness

It was carried out according to the pencil scratch test method of JIS-K-5400. Specifically, the test of the resulting sheet was tested with a pencil having a hardness of 6B initially, and hardness was increased to 5B, 4B, . . . , and the hardness of a pencil when the surface is scratched for the first time was recorded as pencil hardness.

7. Appearance

The surface appearance of the resulted sheet was judged visually as follows.

○: Transparency and gloss are excellent.

x: Whitening and surface unevenness are found, and transparency and gloss are poor.

8. Evaluation of Molded Body

The appearance of a heat molded body was visually observed, and evaluated as follows.

(1) Transparency: Partial or whole opacification and reduction in transparency of a heat molded body was designated as "NG" (not good).

(2) Shaping property: Occurrence of breakage or of failure of the molding in the form of a heat molding die was designated as NG.

Reference Example 1

Production of Propylene Homopolymer PP-4

An SUS 200 liter reaction vessel equipped with a stirrer was purged with nitrogen, and into this was charged 80 liter of hexane, 6.55 mol of tetrabutoxytitanium, 2.8 mol of diisobutyl phthalate and 98.9 mol of tetraethoxysilane, to obtain a uniform solution.

Into the uniform solution, 51 liters of a 2.1 mol/liter solution of butylmagnesium chloride in diisobutyl ether was added dropwise over 5 hours gradually while maintaining the temperature in the reaction vessel at 5° C.

After the completion of addition, the solution was further stirred for 1 hour at room temperature, then solid-liquid separation was conducted at room temperature, and the resulting solid was washed three times with 70 liters of toluene in each case.

To the washed solid was added toluene to obtain a slurry having a concentration of 0.6 kg/liter, then, to this slurry was added a mixture of 8.9 mol of n-butyl ether and 274 mol of titanium tetrachloride, and 20.8 mol of phthalic chloride was further added, then, the mixture was stirred for 3 hours at 110° C. After completion of stirring, solid-liquid separation was conducted, and the resulting solid was washed three times with 90 liters of toluene in each wash at 95° C.

To the washed solid was added toluene to obtain a slurry having a concentration of 0.6 kg/liter, then, to this was added 3.13 mol of diisobutyl phthalate, 8.9 mol of n-butyl ether and 137 mol of titanium tetrachloride, and the mixture was stirred for 1 hour at 105° C. After the completion of stirring, solid-liquid phase separation was effected at 105° C., and the resulted solid was washed twice with 90 liter of toluene in each wash at 95° C.

To the washed solid was added toluene to obtain a slurry having a concentration of 0.6 kg/liter, then, to this was added 8.9 mol of n-butyl ether and 137 mol of titanium tetrachloride, and the mixture was stirred for 1 hour at 95° C. After the completion of stirring, solid-liquid phase separation was effected at 95° C., and the resulting solid was washed three times with 90 liters of toluene in each wash at 95° C.

To the washed solid was added toluene to obtain a slurry having a concentration of 0.6 kg/liter, then, to this was added 8.9 mol of n-butyl ether and 137 mol of titanium tetrachloride, and the mixture was stirred for 1 hour at 95° C. After the completion of stirring, solid-liquid phase separation was effected at 95° C., and the resulting solid was washed three times with 90 liters of toluene in each wash at 95° C., further, washed three times with 90 liters of hexane in each wash at 95° C., then, the solid was dried under reduced pressure to obtain 11.0 kg of a solid catalyst component.

The solid catalyst component was in the good form of particle containing 1.9% by weight of a titanium atom, 20% by weight of a magnesium atom, 8.6% by weight of a phthalate group, 0.05% by weight of an ethoxy group and 0.21% by weight of a butoxy group, and containing no fine powder.

(2) Previous Activation of Solid Catalyst Component

Into an SUS autoclave having a content volume of 3 liters equipped with a stirrer was charged 1.5 liters of n-hexane sufficiently dehydrated and de-aerated, 37.5 mmol of triethylaluminum, 3.75 mmol of t-butyl-n-propyldimethoxysilane and 15 g of the solid catalyst component obtained in the above-mentioned (1), and 15 g of propylene was continuously fed to the charge over 30 minutes while keeping the temperature in the autoclave at from 5 to 15° C., to activate the solid catalyst component.

(3) Production of Polypropylene Polymer (a)

Into an SUS polymerization tank having a volume of 300 liters (first polymerization tank) was fed triethylaluminum at a rate of 1.3 mmol/h, t-butyl-n-propyldimethoxysilane at a rate of 0.13 mmol/h and a solid catalyst component activated in the same manner as in the above-mentioned (2) at a rate of 0.51 g/h continuously, while feeding liquid propylene at a rate of 57 kg/h so as to maintain the polymerization temperature and polymerization pressure at 60° C. and 27 kg/cm$^2$G respectively, and propylene was polymerized in the substantial absence of hydrogen, to obtain a homopolymer of propylene (polypropylene polymer (a)) at a production rate of 2.0 kg/h. The amount of a polymer produced per 1 g of the solid catalyst component was 3920 g, and the limiting viscosity of this polymer was 7.7 dl/g.

(3) Production of Polypropylene Polymer (b)

Into a fluidized bed reactor having a volume of 1 m3 equipped with a stirrer (second polymerization tank) was fed the catalyst-containing polymer transported from the first polymerization tank at a rate of 2.0 kg/h, triethylaluminum at a rate of 60 mmol/h and t-buty-n-propyldimethoxysilane at a rate of 6 mmol/h continuously, while feeding propylene and hydrogen so as to maintain the polymerization temperature, polymerization pressure and hydrogen concentration in gas phase at 80° C., 18 kg/cm$^2$G and 8 vol %, respectively, and propylene was polymerized, to obtain a homopolymer of propylpne at a production rate of 18.2 kg/h. The resulting homopolymer (polypropylene polymer (a) +polypropylene polymer (b). Hereinafter, referred to as "PP-4") had a limiting viscosity of 1.9 dl/g.

From the above-mentioned results, the amount of the polypropylene polymer (b) produced per 1 g of the solid catalyst component was 31760 g, and the ratio of the amount of the polypropylene polymer (a) produced to the amount of the polypropylene polymer (b) produced was 11:89. The limiting viscosity of the polypropylene polymer (b) calculated by the above-mentioned formula (2) was 1.2 dl/g.

(5) Pelletizing of Polymer

A mixture composed of 100 parts by weight of the polymer in the form of powder obtained in the above-mentioned (4), 0.1 part by weight of calcium stearate, 0.05 parts by weight of an antioxidant, Irganox 1010, trade name, manufactured by Ciba Geigy, and 0.2 parts by weight of an antioxidant, Sumilizer BHT, trade name, manufactured by Sumitomo Chemical Co., Ltd. was melt-kneaded at 230°, for pelletizing.

The resulted pellet has a weight-average molecular weight (Mw) of $3.4 \times 10^5$, a molecular weight distribution (Mw/Mn) of 8.0, a MFR of 12 g/10 min, and a die swell ratio (SR) of 2.35.

Example 1

A mixture of 100 parts by weight of PP-1 pellet and 11 parts by weight of PP-4 pellet was melt-kneaded at resin temperatures from 230 to 270° C. by two extruders of 65 mmφ and an extruder of 90 mmφ and the melt-kneaded material was extruded through a T die of feed block type (die width 1250 mm, lip opening 0.8 mm).

The extruded material was cooled and solidified by a cooling roll rotating at 100 m/min controlled at 40° C., to obtain a single-layer film having a thickness of 60 μm. The resulting film had smooth surfaces and excellent transparency, and a die swell ratio of 1.19.

Comparative Example 1

The same procedure was conducted as in Example 1 using only PP-1 pellet, to obtain a single-layer film having a thickness of 60 μm. The resulted film had poor smoothness and poor transparency, and a die swell ratio of 1.16.

Example 2

A mixture of 100 parts by weight of PP-3 pellet and 11 parts by weight of PP-4 pellet was melt-kneaded at resin temperatures from 230 to 260° C. by the same extruders as in Example 1, and the melt-kneaded material was extruded through the same T die as in Example 1 which had been heated to 225° C.

The extruded material was cooled and solidified by a cooling roll rotating at 300 m/min controlled at 40° C., to obtain a single-layer film having a thickness of 20 μm. The molecular weight distribution was 3.5, the die swell ratio was 1.35, the haze was 2.3%, and the Elmendorf tearing strength was 3 kN/m.

Comparative Example 2

The same procedure was conducted as in Example 2 using only PP-2 pellet, to obtain a single-layer film having a thickness of 20 μm. The resulting film had smooth surfaces and excellent transparency, and a molecular weight distribution of 5.0, a die swell ratio of 1.51, a haze of 1.7% and an Elmendorf tearing strength of 0 kN/m.

Comparative Example 3

The same procedure was conducted as in Example 2 using only PP-3 pellet, to obtain a single-layer film having a thickness of 20 μm. The resulting film had poor smoothness and poor transparency, and a molecular weight distribution of 3.2, a die swell ratio of 1.21, a haze of 4.1% and an Elmendorf tearing strength of 3 kN/m.

Example 3

80 parts by weight of a propylene polymer (X) composed of 100 parts by weight of a propylene homopolymer and 0.3 parts by weight of a nucleating agent (sodium 2,2-methylenebis(4,6-di-t-butylphenyl) phosphate, Adekastab NA-21, trade name, manufactured by Asahi Denka Kogyo K.K.), and 20 parts by weight of the propylene homopolymer obtained in Reference Example 1 were mixed and the mixture was processed by a T die film molding machine manufactured by CBC Teck K.K. to obtain a sheet having a thickness of 0.2 mm and a total haze of 5.0%. The results of evaluation of the resulting sheet are shown in Table 1.

Here, the above-mentioned propylene polymer (X) had a die swell ratio of 1.2, a MFR (Melt Flow Rate) of 8.0 g/10 min, and an isotactic pentad ratio of 0.97.

The resulting sheet was softened by heating the surface to 153° C. using a far infrared heater, and the softened sheet was allowed to contact with the surface of the heat molding die shown in FIG. 1, and heat-molded.

The evaluation results are shown in Table 2.

Comparative Example 4

A sheet was obtained in the same manner as in Example 3 except that the propylene polymer (X) was only used without using the propylene homopolymer obtained in Reference Example 1 as the resin, and the sheet was heat-molded. The evaluation results are shown in Tables 1 and 2.

The invention being thus described, it will be apparent that the same may be varied in many ways. Such variations are not to be regarded as a departure from the spirit and scope of the invention, and all such modifications as would be apparent to one skilled in the art are intended to be included within the scope of the following claims.

TABLE 1

|  | Example 1 | Comparative Example 2 |
|---|---|---|
| Die swell ratio | 1.4 | 1.2 |
| Haze (%) | 5.0 | 4.5 |
| Pencil Hardness | F | HB |
| Appearance | ○ | ○ |

TABLE 2

| Evaluation of molded body | | File heating time (sec) | | | | | | | | | |
|---|---|---|---|---|---|---|---|---|---|---|---|
| | | 31 | 32 | 33 | 34 | 35 | 36 | 37 | 38 | 39 | 40 | 41 |
| Example 1 | Transparency | ○ | ○ | ○ | ○ | ○ | ○ | ○ | ○ | ○ | ○ | NG |
| | Shaping property | NG | ○ | ○ | ○ | ○ | ○ | ○ | ○ | ○ | ○ | ○ |
| Comparative | Transparency | ○ | ○ | ○ | ○ | ○ | ○ | ○ | ○ | | | |

TABLE 2-continued

|  | Evaluation of molded body | File heating time (sec) | | | | | | | | | | |
|---|---|---|---|---|---|---|---|---|---|---|---|---|
|  |  | 31 | 32 | 33 | 34 | 35 | 36 | 37 | 38 | 39 | 40 | 41 |
| Example 1 | Shaping property | NG | o | o | o | o | o | o | NG | NG | | |

What is claimed is:

1. A laminated molded body, comprising a heat molded body having at least one layer comprising a polypropylene resin composition containing 100 parts by weight of a polypropylene resin (A) having a die swell ratio of less than about 1.70 and about 0.01 to about 45 parts by weight of a polypropylene resin (B) having a die swell ratio of about 1.80 or more, and a substrate comprising a thermoplastic resin.

* * * * *